Sept. 29, 1970  J. L. BONANNO  3,531,119
RACING TOY HAVING PLAYER CONTROLLED VEHICLE PROPELLING MEANS
Filed Feb. 26, 1969  3 Sheets-Sheet 1
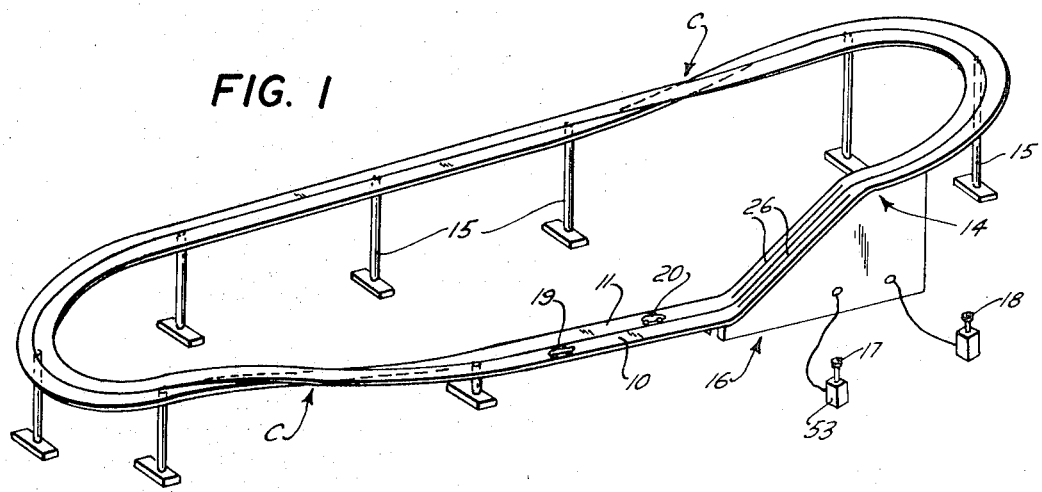
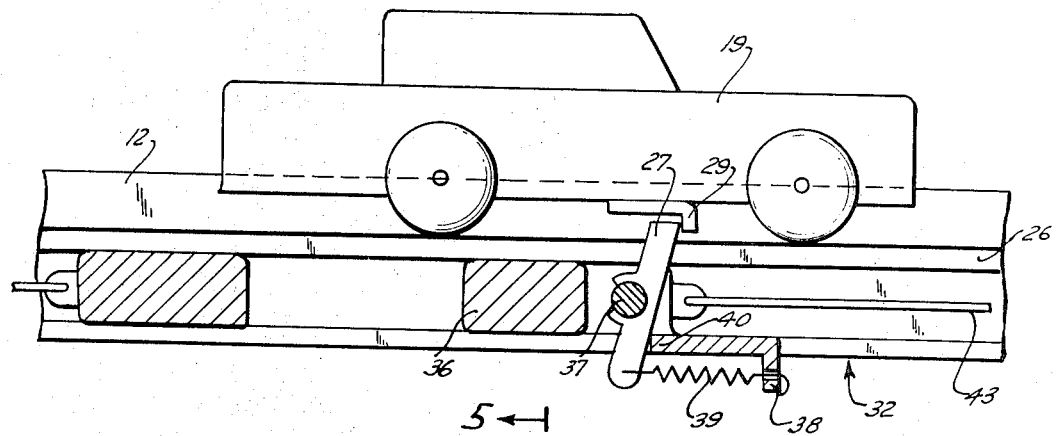
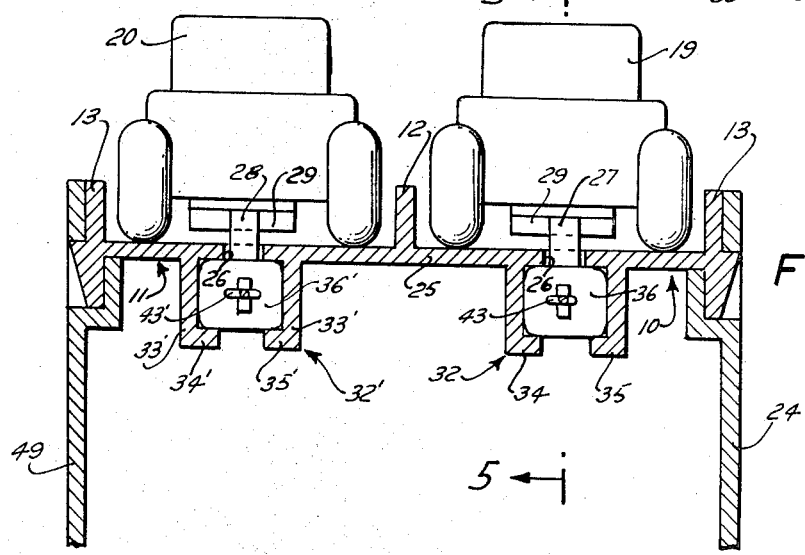
INVENTOR
JOSEPH L. BONANNO
BY
Breitenfeld & Levine
ATTORNEYS

INVENTOR
JOSEPH L. BONANNO

BY
ATTORNEYS

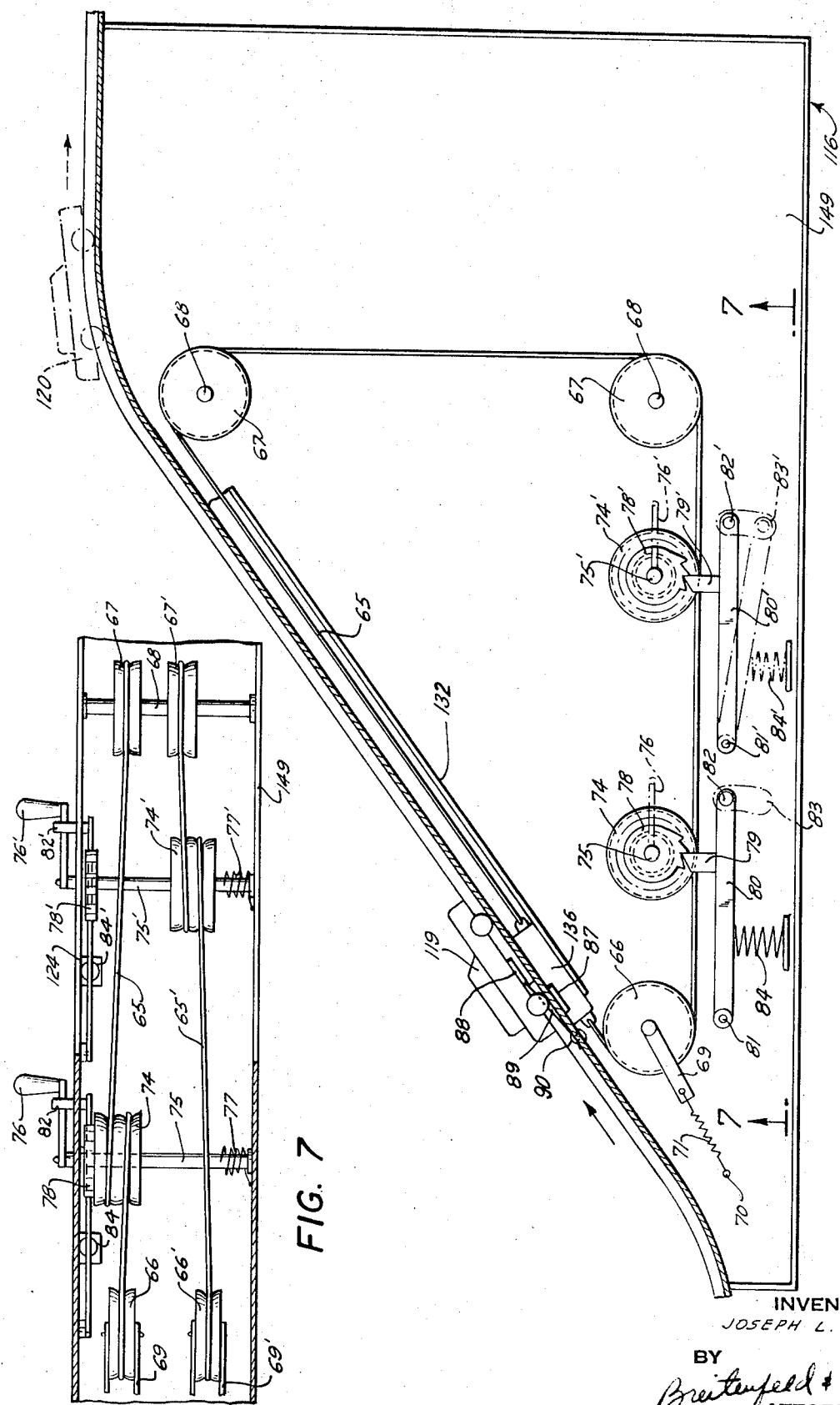

United States Patent Office 3,531,119
Patented Sept. 29, 1970

3,531,119
RACING TOY HAVING PLAYER CONTROLLED
VEHICLE PROPELLING MEANS
Joseph L. Bonanno, South Orange, N.J., assignor to
Topper Corporation, a corporation of Delaware
Filed Feb. 26, 1969, Ser. No. 802,366
Int. Cl. A63f 9/14
U.S. Cl. 273—86                                    13 Claims

ABSTRACT OF THE DISCLOSURE

Two side-by-side tracks of equal length support rollable vehicles each of which moves by gravity around entire track except for short uphill portion. Vehicle driving member movable along and beneath each uphill track portion by a driven belt in response to movement of a control operated by player. Driving member carries pawl or magnet for moving vehicle along uphill portion. Player control is a switch when electric motor is used to drive belt. Alternatively, spring driven pulley may drive belt, and player controls pawl and ratchet wheel for selectively permitting or preventing pulley rotation, manipulating a handle to tension the spring.

---

Figure 3:
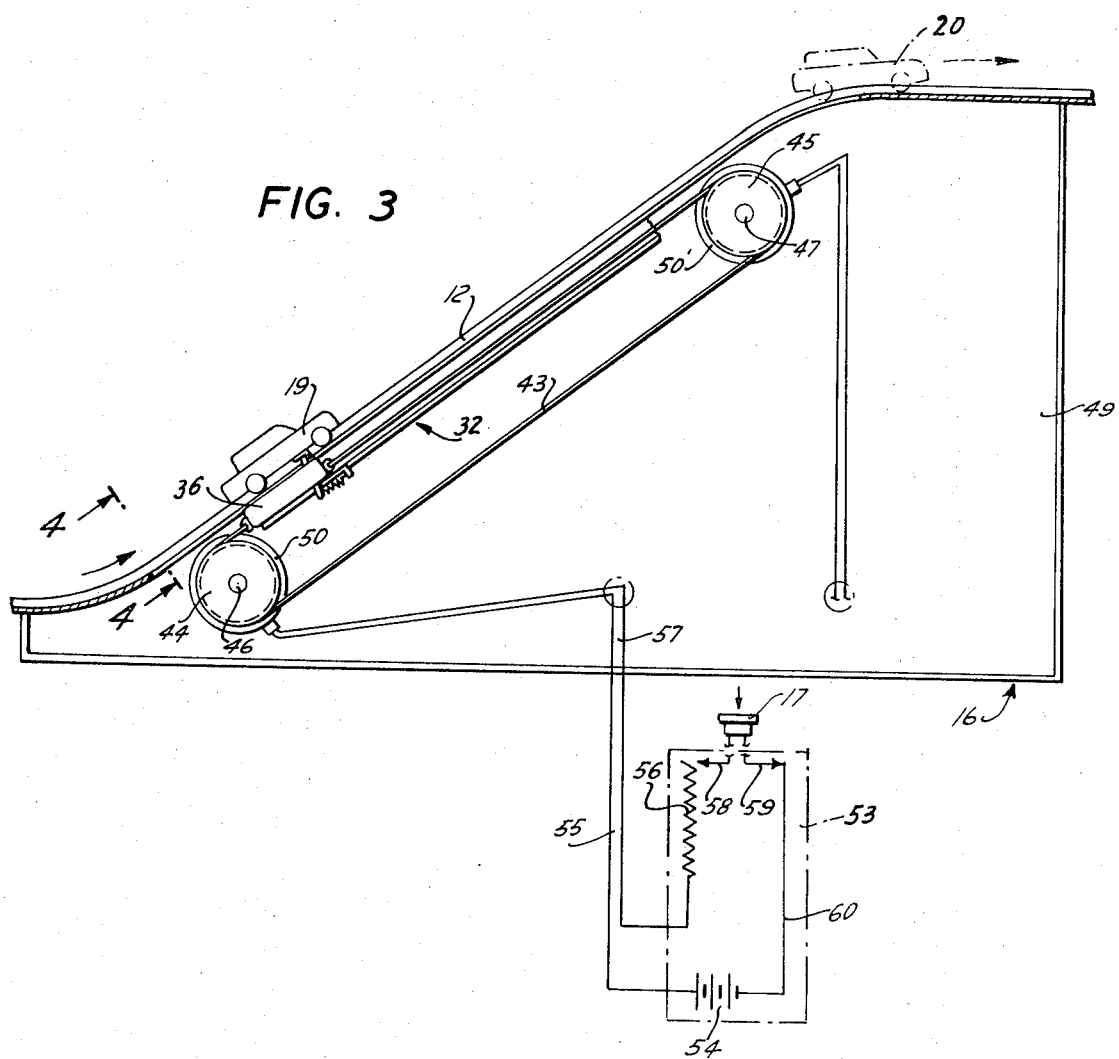

This invention relates to racing toys of the type in which rollable vehicles allocated to different players move around two or more side-by-side continuous tracks of equal length. More particularly, the invention relates to such toys wherein each track is inclined in one direction for most of its length to define a downhill portion along which a vehicle can move by gravity, a relatively short length of the track being inclined in the opposite direction to define an uphill portion joining the highest and lowest points of the downhill portion.

So that a vehicle can be caused to move along its track through successive unbroken cycles or laps, some means must be provided for applying an outside force to the vehicle so as to propel it along the uphill track portion. Once the vehicle reaches the top of the hill, it can be released, whereupon it moves around the track by gravity to the bottom of the uphill portion. At this point, the propelling means is again used to drive the vehicle up the hill.

In some toys of this type, the propelling means operates automatically. For example, a portion of the run of a continuous chain extends along the upper surface of the uphill track portion. The chain is moved continuously by an electric motor, and each vehicle has a depending part for engaging the chain. Thus, when a vehicle reaches the bottom of the uphill track portion, its depending part engages the moving chain and the vehicle is pulled up the hill by the chain, the vehicle and chain becoming disengaged at the top of the hill permitting the vehicle to roll around the track to the bottom of the hill where it once again engages the chain. Such toys have limited play value, since once the child places a vehicle on the track, and actuates the switch to turn on the motor for driving the chain, there is nothing more for the child to do but watch the toy perform.

The present invention stems from a recognition of the fact that the play value of a racing toy of the type described is greatly enhanced by making the vehicle-propelling means directly controllable by a player. In this way, a child must develop the skill required to apply a propelling force to a moving vehicle when it arrives at the uphill track portion with a minimum of lost motion by the player resulting in a minimum loss of speed by the vehicle. Since the toy involves at least two tracks, players can compete against each other and are therefore encouraged to develop the skill just mentioned.

It is therefore an object of the present invention to provide a racing toy of the type described which is relatively simple to construct, and yet which requires the exercise of coordination by the player in order to keep his vehicle moving with the smallest loss of speed during its movement along the uphill track portion.

To carry out this objective, the invention provides a vehicle driving member or carriage slidable in a guide-way directly beneath each uphill track portion. The carriage may carry a pawl or other projection extending upwardly through a slot in the track portion for engaging a depending part of a vehicle. Alternatively, the carriage may carry a magnet and the vehicle may carry a magnet or a piece of magnetic material. In any case, upward movement of the carriage causes upward movement of the vehicle. A rotatable means, such as an electric motor or spring-driven pulley, is provided for moving the carriage, the motion being transmitted to the carriage by a belt trained about pulleys. If an electric motor is used, a switch operable by the player controls energization of the motor, preferably via a rheostat so that motor speed may be controlled. Alternatively, if a spring driven pulley is used, the player manipulates a handle to tension the spring, and also operates a pawl and ratchet arrangement to permit rotation of the pulley, and hence movement of the carriage, when desired.

Additional features and details of the invention will be apparent from the following description in which reference is made to the accompanying drawings.

Figure 2:
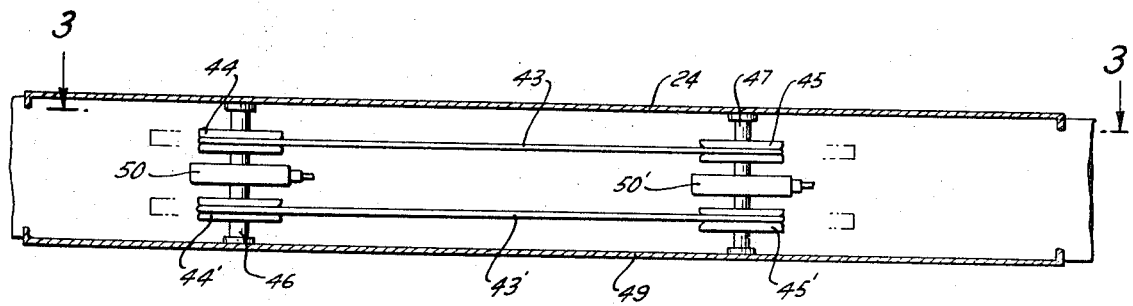

In the drawings:
FIG. 1 is a perspective view of a racing toy according to the present invention;
FIG. 2 is a bottom view of the toy base;
FIG. 3 is a vertical cross-sectional view taken on line 3—3 of FIG. 2;
FIG. 4 is a cross-sectional view taken on line 4—4 of FIG. 3;
FIG. 5 is a cross-sectional view taken on line 5—5 of FIG. 4;
FIG. 6 is a view similar to FIG. 3 of an alternative embodiment of the invention; and
FIG. 7 is a cross-sectional view taken on line 7—7 of FIG. 6.

One embodiment chosen to illustrate the present invention is illustrated in FIGS. 1–5. The racing toy shown in FIG. 1 comprises two side-by-side continuous tracks 10 and 11 of generally elliptical contour. Although two tracks are shown in the present example, as many side-by-side tracks as desired may be used. The tracks may be formed of a molded plastic material, and may be provided in sections adapted to be snapped together to form the continuous tracks. As shown in FIG. 4, the two track regions of each section may be formed integrally, with an integral upstanding divider 12 separating the two tracks. The tracks are also provided with outer upstanding walls 13 to prevent the vehicles from rolling off the tracks.

Each track 10 and 11 has a downhill and an uphill portion. The downhill portion, which includes most of the track length, begins at the highest point of the track, in the region H, and extends in a counterclockwise direction (in FIG. 1) to the lowest point of the track, in the region L. The uphill portion is relatively short and extends from the region L to the region H. To make the two tracks of equal length, two cross-overs C are provided, track 11 crossing over track 10 at one cross-over, and track 10 crossing over track 11 at the other.

The downhill track portion could have slight rises along its length if desired. For the purpose of the present invention, it is important only that a wheeled vehicle arriving at the region H will travel under the influence of gravity alone to the region L. The downhill portions of the tracks 10 and 11 are supported by stanchions 15, and the uphill portions are supported by a base or housing 16 enclosing the mechanism for propelling vehicles along the uphill track portions.

When the toy is in use, each player controls a mechanism for propelling his vehicle along the uphill portion of its respective track. The vehicle then rolls along the downhill portion under the influence of gravity until it reaches the lower part of the uphill portion at which point the player again propels his vehicle up the hill. The player whose vehicle completes a predetermined number of laps or cycles around the track first is the winner, and the winner will ordinarily be the player most proficient at operating his vehicle-propelling mechanism.

In the present example, the housing 16 contains two vehicle-propelling mechanisms, one being operated by a push button 17 and the other by a push button 18. Push button 17 is actuated to propel a vehicle 19, illustrated as a toy automobile, along the uphill portion of track 10, and push button 18 is actuated to propel another toy automobile 20 along the uphill portion of track 11. The floor 25 (FIG. 4) of the uphill portion of each track is formed with a central longitudinal slot 26, and a pawl projects upwardly through each slot.

As each push button 17 or 18 is depressed the pawl 27 or 28 (FIGS. 4 and 5), respectively associated with it moves from the lower end of its respective slot 26 to the upper end. Each vehicle 19 and 20 is provided with a depending lip 29 adapted to be engaged by one of the pawls.

Thus, when the vehicle 19, for example, arrives at the lower region of the uphill portion of track 10, the appropriate player depresses push button 17 so that the pawl 27 engages the depending lip 29 of the vehicle and propels it up the hill. Thereafter, the player operates the push button 17 to return the pawl 27 to the bottom of the uphill track portion, in preparation for again propelling the vehicle 19 up the hill. To a great extent, the skill required in playing with the present toy involves the ability to actuate the push button 17 or 18 at precisely the right time so that the respective pawl engages the lip of the vehicle before the latter comes to a stop on the uphill track portion. In this way, full advantage is taken of the initial movement of the vehicle up the hill due to its inertia.

The mechanisms for transmitting movements of the handles 17 and 18 to their respective pawls 27 and 28 are illustrated in detail in FIGS. 2–5. The two mechanisms are identical, and therefore only one will be described. However, corresponding parts of the other mechanism bear identical reference numerals followed by a prime. Mounted on the lower face of each uphill track portion is a guideway 32 (FIGS. 3–5) defined by two parallel walls 33, which may be integrally formed with the track floor 25, each having an inwardly directed flange 34, the space between the flanges defining a slot 35. The guideway 32 extends for substantially the full length of the uphill track portion.

Slidably arranged within the guideway 32 is a vehicle driving member or carriage 36 carrying near its front end a transverse pin 37 (FIG. 5) upon which pawl 28 is pivotally supported. At the front end of the carriage is a depending finger 38 to which one end of a tension spring 39 is secured, the other end of the spring being secured to the lower end of the pawl 28. The spring 39 normally holds the pawl 28 against an abutment portion 40 of the carriage 36 so that the pawl cannot rotate in a counterclockwise direction when in the position shown in FIG. 5. Consequently, when the carriage 36 is moved upwardly along the guideway 32, this movement is transmitted to the lip 29 of vehicle 19 by the pawl. However, the pawl can rotate clockwise, against the force of spring 39, so that when vehicle 19 enters the uphill track portion, lip 29 can move past the pawl. In other words, when vehicle 19 is moving from the left toward the right, i.e., uphill, and the front face of its lip 29 strikes the pawl 28 rotating it clockwise, the upper end of he pawl moves toward the slot 26 permitting the vehicle to pass. The pawl is then immediately snapped into a position for engaging the rear face of the lip 29 by the spring 39.

The carriage 36 is connected at each end to one end of a flexible belt or cord 43 trained about a pair of pulleys 44 and 45 (FIGS. 2 and 3). Pulley 44 is fixed on a horizontal shaft 46 rotatably supported at its ends between the front wall 24 and rear wall 49 of the housing 16. Similarly, pulley 45' is fixed on a horizontal shaft 47 rotatably supported at its ends between the front and rear walls of the housing. On the other hand, pulleys 45 and 44' are idlers rotatable with respect to the shafts 47 and 46, respectively, which support them. An electric motor 50 is arranged to rotate shaft 46, a similar motor 50' serving to rotate shaft 47.

Push button 17 is mounted on an enclosure 53 (FIGS. 1 and 3) containing a battery power source 54, connected by a conductor 55 to the motor 50, a rheostat resistance 56, connected by a conductor 57 to the motor 50, and a pair of wiper contacts 58 and 59 movable vertically in FIG. 3 in response to actuations of the push button 17. When push button 17 is in its uppermost position, contact 58 is spaced from the end of resistance 56, so that the circuit is open and the motor 50 is deenergized. When push button 17 is depressed, the circuit is closed, and the battery 54 energizes motor 50, causing rotation of pulley 44 and hence movement of belt 43. Consequently, assuming the vehicle 19 and carriage 36 are in the position shown in FIG. 3, the carriage 36 moves upwardly pushing the vehicle up the hill. Obviously, the further the push button is depressed, the smaller the part of resistance 56 in the circuit, and hence the faster the carriage 36 and vehicle 19 move. Wiper contact 59 remains in contact with conductor 60 throughout the movement of the push button.

After the vehicle 19 reaches the top of the hill and begins its downhill movement, the player continues to energize the motor 50 so as to return carriage 36 to a position at the bottom of the hill to await the arrival of the vehicle. The player can judge the proper position of the carriage by noting the location of the pawl 27 in slot 26. If desired, a second carriage might be provided along the belt 43 so that when one carriage reaches the top of the hill the other is almost at the bottom and only a very brief energization of the motor brings it to a position in which it can engage the vehicle when the latter arrives at the bottom of the hill.

An alternative vehicle driving mechanism arrangement is illustrated in FIGS. 6 and 7. In this embodiment, the mechanism associated with each track includes a flexible belt 65 (since both mechanisms are identical, only one will be described and corresponding parts of the other mechanism bear the same reference numerals followed by a prime) connected to the ends of carriage 136 (parts corresponding to those of FIGS. 1–5 bear the same reference numerals preceded by a one), trained about three pulleys 66 and 67. Pulleys 67 are rotatably mounted on fixed shafts 68 extending horizontally between the front and rear walls of housing 116. Pulley 66 rotates on a shaft carried between the arms of a yoke 69, one end of the yoke being connected at 70 to the housing by a tension spring 71. Spring 71 serves to maintain the belt 65 taut at all times.

Belt 65 is wrapped around a drum 74 fixed to a horizontal shaft 75 rotatably supported by the front and rear walls 124 and 149, respectively, of housing 116. Shaft 75 projects through the front wall 124 of the housing and carries on its end outside the housing a crank handle 76. A coil spring 77 encircles shaft 75, one end of the spring being anchored to the housing, and the other end being secured to the shaft. The arrangement is such that when the spring 77 is tensioned, it tends to rotate shaft 75 clockwise (in FIG. 6) whereby the belt 65 moves clockwise around the triangle whose corners are defined by the pulleys 66 and 67. Consequently, the portion of belt 65 parallel to guideway 132 moves upwardly carrying the carriage 136 and vehicle 119 with it.

Fixed to shaft 75 is a member presenting at least one abutment, in the present example a ratchet wheel 78, the peripheral teeth of which are adapted to be engaged by a pawl 79 carried by a lever 80. One end of lever 80 is pivoted at 81 to the housing 116, and the other end carries a handle 82 projecting through an arcuate slot 83 in the housing front wall 124. A compression spring 84 urges the lever 80 upwardly to produce engagement between the pawl 79 and ratchet wheel 78 so as to prevent rotation of shaft 75 and hence drum 74. When the handle 82 is pushed downwardly along slot 83, against the force of spring 84, pawl 79 releases the ratchet wheel permitting spring 77 to rotate shaft 75.

In this example, motion of the rack 136 is transmitted to the vehicle 119 by a permanent magnet 87 fixed to the upper face of the rack. The magnet 87 can perform its function if the vehicle 119 is fabricated of magnetic material or if it carries a plate of magnetic material on its lower face. Preferably, however, the vehicle is provided on its lower face with a permanent magnet 88, and preferably like poles of the magnets face each other so that the magnets repel each other. In this way, very small and inexpensive magnets may be employed, and yet the force of repulsion between them is sufficient to transmit a propelling force to the vehicle 119 when the rack 136 moves along its guideway 132. When a magnet is employed as just described, no slot comparable to the slots 26 need be provided in the floor of each track, since the magnetic field is effective through the track material.

Near the lower end of its uphill portion, the floor 125 of each track is furnished with a resilient stop defined by a resilient wire 89 anchored to the track at one end by a rivet 90. The free end of the wire 89 is bent downwardly to pass through a hole in the floor 125, and then forwardly so that it abuts against the lower surface of the floor. When moving vehicle 119 reaches the bottom of the uphill track portion and due to its inertia begins moving up the hill, the forward end of magnet 88 slides over wire 89, the latter moving downwardly through the hole to permit the vehicle to pass. Consequently, wire 89 forms no obstacle to forward movement of the vehicle. However, once the magnet 88 passes over it, wire 89 springs back to its normal position, shown in FIG. 6, into the path of backward movement of the vehcile magnet 88. Thus, cooperation of the stop 89 and magnet 88 (serving in this case simply as an abutment) prevents the vehicle 119 from rolling backward off the uphill track portion, so that a player can never lose complete control of the vehicle, i.e., when the vehicle is resting against stop 89, a player can manipulate his handle 76 to bring the magnet 87 opposite the vehicle magnet 88 and propel the vehicle up the hill.

To propel his vehicle up the hill, a player shifts his handle 82 downwardly releasing the engagement between pawl 79 and ratchet wheel 78, thereby permitting spring 77 to rotate shaft 75 and drum 74. This causes the belt 65 to move carriage 136 up the hill, and due to the cooperation of the fields of magnets 87 and 88, the car 119 is moved up the hill. After the car 119 begins its downhill journey, the player rotates crank handle 76 in a counterclockwise direction (in FIG. 6) to retension spring 77 and return carriage 136 to a position at the bottom of the hill. Some means should be provided to give the player some indication when the carriage reaches the desired location. For example, the housing front wall 124 may be furnished with a window (not shown) through which the player can view the carriage.

While in the embodiment just described a magnet is employed to transmit motion from the vehicle driving member to the vehicle, and in the embodiment of FIGS. 1–5 a pawl is used for this purpose, it should be mentioned that these elements are interchangeable, i.e., either of the embodiments disclosed herein can include either a pawl or a magnet as desired.

The invention has been shown and described in preferred form only, and by way of example, and it is understood, therefore, that many variations may be made in the invention which will still be comprised within its spirit.

What is claimed is:

1. A racing toy comprising:
at least two side-by-side continuous toy tracks of equal length, a relatively short length of each track being inclined to define an uphill portion, substantially all the remaining length of each track being inclined to define a downhill portion,
a plurality of gravity operated toy vehicles for movement along said tracks,
a vehicle driving member movably mounted beneath each uphill track portion,
means for guiding the movements of said driving member along a path parallel to its respective uphill track portion,
means carried by said driving member for transmitting movements of the latter to a vehicle rollably supported on the track portion above,
rotatable means allocated to each of said vehicle driving members,
motor-powered means for causing rotation of each of said rotatable means through more than 360°,
manually operable means manipulable by a player for controlling said motor-powered means, and
means for transmitting the rotation of said rotatable means to one of said vehicle driving members,
whereby one of said vehicles allocated to a player may be caused to traverse its respective uphill track portion upon operation of one of said manually operable means by the player so as to produce appropriate movement of the respective driving member.

2. A racing toy as defined in claim 1 wherein each uphill track portion is furnished with a longitudinal slot, and said transmitting means carried by said driving member is an element projecting upwardly through said slot and above the upper surface of said uphill track portion, said element being slidable within said slot and adapted to engage a vehicle supported on said uphill track portion.

3. A racing toy as defined in claim 2 wherein said element is resiliently biased upwardly so that it can be moved downwardly by a vehicle passing over it while traveling in an uphill direction, but said element remaining in its uppermost position when contacted by a vehicle rolling down said uphill track portion so as to halt such movement of the vehicle and transmit upward movement of said driving member to the vehicle.

4. A racing toy as defined in claim 2 wherein said element is a pawl pivotally mounted on said driving member, and including means for resiliently biasing said pawl upwardly, said pawl moving downwardly against the force of said biasing means when contacted by a vehicle traveling in an uphill direction so that the vehicle can move past said pawl, and means preventing said pawl from moving downwardly when contacted by a vehicle which has moved past it, whereby the pawl serves to limit the downhill movement of such a vehicle on the uphill track portion and to transmit upward movement of said driving member to the vehicle.

5. A racing toy as defined in claim 1 wherein said transmitting means carried by said driving member is a magnet cooperable with a magnetic part carried by a vehicle, the magnetic field of said magnet being operative through said uphill track portion.

6. A racing toy as defined in claim 5 including a vehicle carrying a permanent magnet, and wherein said transmitting means is a permanent magnet, said magnets being arranged so that their fields oppose each other when said vehicle is on said uphill track portion.

7. A racing toy as defined in claim 5 including a resilient stop near the lower end of each of said uphill track portions, said stop permitting a vehicle to pass in an uphill direction but limiting movement of the vehicle in the downhill direction along the uphill track portions, said stop permitting a vehicle to pass in an uphill direction but limiting movement of the vehicle in the downhill direction along the uphill track portion.

8. A racing toy as defined in claim 1 wherein said rotation transmitting means includes a continuous belt secured to each of said driving members, and pulleys supporting each belt.

9. A racing toy as defined in claim 8 wherein a portion of the length of travel of each belt is parallel to one of said uphill track portions, one of said vehicle driving members being secured to said parallel portion of each belt, each belt being advanced around said pulleys in response to manipulation of its respective manually operable means, whereby upon appropriate manipulation of either of said manually operable means its respective belt and vehicle driving member moves parallel to said uphill track portions.

10. A racing toy as defined in claim 1 wherein each of said rotatable means is an electric motor, said rotation-causing means is a source of electric power, and said manually operable means is a switch in circuit between said power source and motor.

11. A racing toy as defined in claim 10 including a rheostat in series with said power source for varying the speed of said motor.

12. A racing toy as defined in claim 1 wherein each of said rotatable means is a pulley mounted on a shaft, and said rotation-causing means is a spring adapted when tensioned to rotate said pulley, and including an abutment means rotatable with said pulley, said manually operable means including means for selectively blocking said abutment means, to prevent pulley rotation, and releasing said abutment means, to permit pulley rotation.

13. A racing toy as defined in claim 12 including a manually operable handle for tensioning said spring preparatory to rotation of said rotatable means.

References Cited

UNITED STATES PATENTS

| | | | |
|---|---|---|---|
| 749,677 | 1/1904 | Jackman | 104—60 |
| 1,724,447 | 8/1929 | Abbott et al. | 273—120 |
| 1,780,081 | 10/1930 | Keiser | 273—86 |
| 3,337,985 | 8/1967 | Ryan et al. | 104—60 X |

FOREIGN PATENTS

| | | |
|---|---|---|
| 882,269 | 11/1961 | Great Britain. |

ANTON O. OECHSLE, Primary Examiner

T. ZACK, Assistant Examiner

U.S. Cl. X.R.

104—60; 273—120